Figure 1:
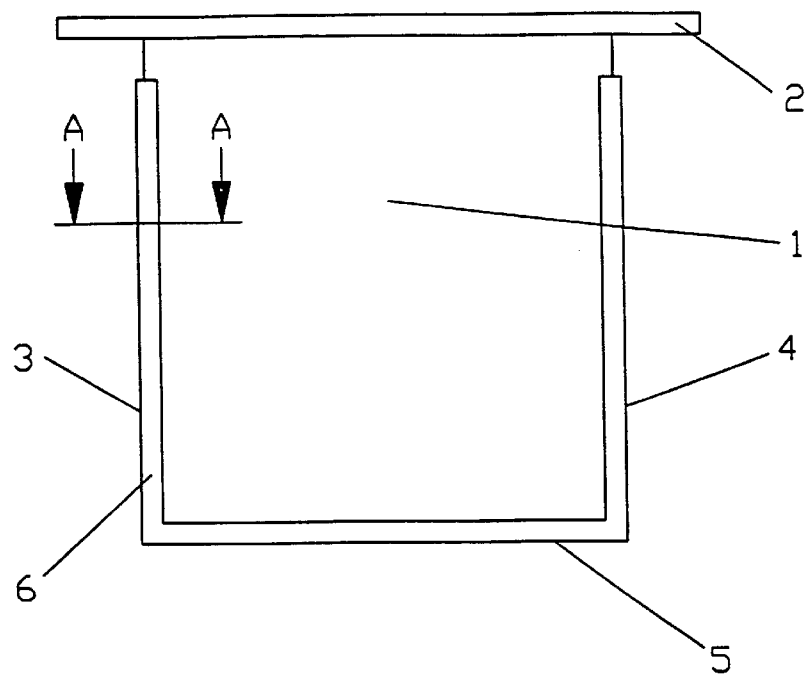

United States Patent
Marttila

[11] Patent Number: 5,928,482
[45] Date of Patent: Jul. 27, 1999

[54] METHOD FOR PRODUCING A MOTHER PLATE FOR ELECTROLYTIC CLEANING AND A MOTHER PLATE PRODUCED ACCORDING TO SAID METHOD

[75] Inventor: Tom Marttila, Kirkkonummi, Finland

[73] Assignee: Outokumpu Wenmec OY, Finland

[21] Appl. No.: 09/077,261

[22] PCT Filed: Dec. 5, 1996

[86] PCT No.: PCT/FI96/00650

§ 371 Date: May 22, 1998

§ 102(e) Date: May 22, 1998

[87] PCT Pub. No.: WO97/21851

PCT Pub. Date: Jun. 19, 1997

[30] Foreign Application Priority Data

Dec. 8, 1995 [FI] Finland ..................... 955919

[51] Int. Cl.⁶ .................. C25B 1/00; C25C 7/02
[52] U.S. Cl. ............ 204/281; 264/252; 264/272.11
[58] Field of Search ............... 205/76; 204/281, 204/279; 264/252, 271.1, 272.11

[56] References Cited

U.S. PATENT DOCUMENTS

| | | | |
|---|---|---|---|
| 4,207,147 | 6/1980 | Babin | 204/281 X |
| 4,406,769 | 9/1983 | Berger | 204/281 |
| 4,776,928 | 10/1988 | Perlich | 204/281 X |
| 5,314,600 | 5/1994 | Webb et al. | 204/281 X |
| 5,785,827 | 7/1998 | Dougherty | 204/281 X |

FOREIGN PATENT DOCUMENTS

| | | |
|---|---|---|
| 0 028284 A1 | 5/1981 | European Pat. Off. . |
| 0 454056 A1 | 10/1991 | European Pat. Off. . |
| 3835727 | 5/1990 | Germany . |

*Primary Examiner*—Donald R. Valentine
*Attorney, Agent, or Firm*—Morgan & Finnegan, L.L.P.

[57] ABSTRACT

The invention relates to a method for producing a mother plate used in electrolytic cleaning and to the mother plate which plate comprises a metal plate (1), a plate support member (2) and a plastic edge strip (6) provided on at least one of the sides (3,4,5) of the metal plate (1). According to the invention, in order to form the edge strip (6), in the mother plate (1) there is attached a mold (7) provided with an extruder (11) for extruding the edge strip material (12), so that the extruder (11) is made to proceed, with respect to the mold (7), essentially along the whole length of the mold (7), and that prior to detaching the mold (7) from the mother plate (1), the edge strip material (12), such as ethylenic acid copolymer, is rendered in an essentially solid form. Moreover, according to the invention at least two opposite sides (3,4) of the mother plate (1) are provided with an edge strip (6).

12 Claims, 2 Drawing Sheets

METHOD FOR PRODUCING A MOTHER PLATE FOR ELECTROLYTIC CLEANING AND A MOTHER PLATE PRODUCED ACCORDING TO SAID METHOD

The present invention relates to a method for producing a mother plate for electrolytic cleaning and to a mother plate produced according to said method, so that the deposits accumulated on the mother plate surface during electrolytic cleaning are easily removable from the mother plate.

The refining of many metals, such as copper, zinc and nickel, includes electrolytic cleaning where harmful impurities are separated from the metal to be produced. The metal produced in electrolytic cleaning is gathered on the cathode by means of electric current. Usually electrolytic cleaning is carried out in tanks filled with an electrolyte containing sulphuric acid and, immersed therein, a number of plate-like anodes and cathodes made of some electro conductive material and placed in an alternating fashion. At the top edges, the anodes and cathodes are provided with lugs or bars for suspending them at the tank edges and for connecting them to the power circuit. The metal to be produced is brought into the electrolytic process either as soluble anodes, so-called active anodes, or as dissolved in the electrolyte at some preceding process stage, in which case the employed anodes are insoluble, so-called passive anodes.

The cathode used in electrolytic cleaning can be produced of the desired metal to be produced, in which case the deposit need not be stripped from the original cathode plate. Usually, however, the cathode, i.e. the mother plate, to be immersed in the electrolytic tank is made of some other metal than the one to be produced. Such materials of the mother plate can be for instance stainless steel, aluminum or titanium. In that case the metal to be produced is gathered on the surface of the mother plate in deposits, which are stripped from the mother plate at defined intervals.

Owing to electric current, the metal produced in electrolytic cleaning is accumulated in deposits on all electro conductive surfaces of the mother plate, i.e. if the mother plate is completely electro conductive, the metal to be produced covers in a uniform deposit the mother plate in all parts immersed in the electrolyte. Now the deposits of the metal to be produced, accumulated on two sides of the mother plate, are on three sides attached to each other over the narrow edges of the mother plate, and thus the deposits of the metal to be produced are extremely difficult to remove from the mother plate. In order to facilitate the removal of the deposits of the metal to be produced from the surfaces of the mother plate, it is necessary to prevent the metal to be produced from accumulating deposits over the narrow edges of the mother plate, i.e. the edges of the mother plate must be made non-conductive.

The best-known way to make the edges of the mother plate non-conductive is to cover the edges with edge strips made of some insulating material, such as plastic. Generally the insulating strips are plastic profiles with a groove-shaped cross-section and are pressed onto the edges of the mother plate and remain in place either owing to the pressure created by the transformation, by rivets inserted through the mother plate or due to a combination of these. Because of the structure of the edge strips, the edge strips become too thick with respect to the required insulation, and the seam between the strip and the mother plate is not compact, but both the electrolyte and the metal to be produced have access therein. When electrolyte enters in between the mother plate and the edge strip, this often leads to an intensive corrosion of the mother plate, which results in the detachment of the strip and in an essential shortening of the mother plate's life. On the other hand, when the metal to be produced begins to accumulate in between the mother plate and the edge strip, this causes both a detachment of the strip from the mother plate and essential difficulties in the removal of the metal to be produced, in which case the edge strip is rapidly destroyed, either when removing the metal to be produced or owing to the wedging effect thereof.

A mother plate provided with edge strips is described for instance in the EP patent application 454,056, where at least one edge of a cathode plate used in the electrowinning of zinc is provided with an insulating strip made of plastic, i.e. copolymeric polyolefine. Said EP patent application 454,056 also comprises a method for producing the cathode plate. According to the method, the insulating strip is extruded and is, after extrusion, pressed in the still hot state—within a temperature range of 100–200° C.—against the edges of the length of cathode plate. Thereafter the length of cathode plate provided with insulating strips is cut into cathode plates. Consequently, by using the method according to the EP patent application 454,056, there are obtained insulating strips only for the vertical edges of the mother plate. Moreover, the insulating strip may be damaged while cutting the length of cathode plate, in which case some of the metal to be produced in the electrowinning process may proceed for instance to underneath the insulating strip.

The object of the present invention is to eliminate some of the drawbacks of the prior art and to achieve a new and more viable method for producing mother plates for electrolytic cleaning and a mother plate produced according to said method, so that the deposition of the metal over the edges of the mother plate is prevented by means of edge strips installed on at least two edges of the mother plate. The essential novel features of the invention are apparent from the appended claims.

In the method according to the invention, the edge strip material is extruded in a mould attached to the mother plate, so that the extruder moves along the mould attached to the mother plate, essentially along the whole length of the mould. Advantageously the employed edge strip material is a material which forms, when being solidified, a chemical bond with the metal material of the mother plate. After the strip material is solidified into an essentially solid state, the mould is detached from the mother plate, and the edge strip is ready to be used in electrolytic cleaning.

The mother plate produced according to the invention and meant for electrolytic cleaning is advantageously provided, at least on two opposite sides of the mother plate, with a plastic edge strip which forms a chemical bond with the metal material of the mother plate. Prior to the formation of the edge strips, the mother plate is sized up to be suitable for electrolytic cleaning. Now for instance the side lengths of the mother plate are measured so that the mother plates fit into the electrolytic tank.

According to the invention, a mother plate can be provided with an edge strip so that the strip is located on two opposite sides of the mother plate, and at least on one side connecting these, so that the edge strip is essentially uniform and can be produced in one stage along its whole length. In that case the mould used in the method is shaped so that the mould can simultaneously be attached to three sides of the mother plate.

According to the invention, a mother plate can also be provided with an edge strip so that the strip is located only on two opposite sides of the plate. In that case the strip is produced by means of extruders located on both sides of the mother plate, or then the strip is formed first on one side of the mother plate, whereafter the plate is turned in horizontal position 180 degrees around its vertical axis. After turning, the edge strip is produced according to the method of the invention on the opposite side of the mother plate. Now the mould is essentially of the same length as the side to be provided with an edge strip.

According to the invention, the employed edge strip material is copolymer, such as ethylenic acid copolymer, or polypropylene. Thus the extrusion of the plastic strip material can be carried out within the temperature range of 150–300° C.

According to the invention, the following advantages are achieved:

The mother plate supports the edge strip throughout, so that the strip becomes mechanically durable.

The edge strip can be made thinner than in the prior art, so that it better conforms to the requirements of electric insulation.

The access of electrolyte and the metal to be produced to in between the edge strip and the mother plate is prevented owing to a chemical bond.

The metal to be produced is stripped from the mother plate easily and reliably.

The working life of both the mother plate and the edge strip are extended.

The maintenance costs of the mother plate and the edge strip are decreased.

The edge strip can be produced in an essentially short time, by means of a relatively economic equipment, which is either mechanical or automated.

Figure 2:
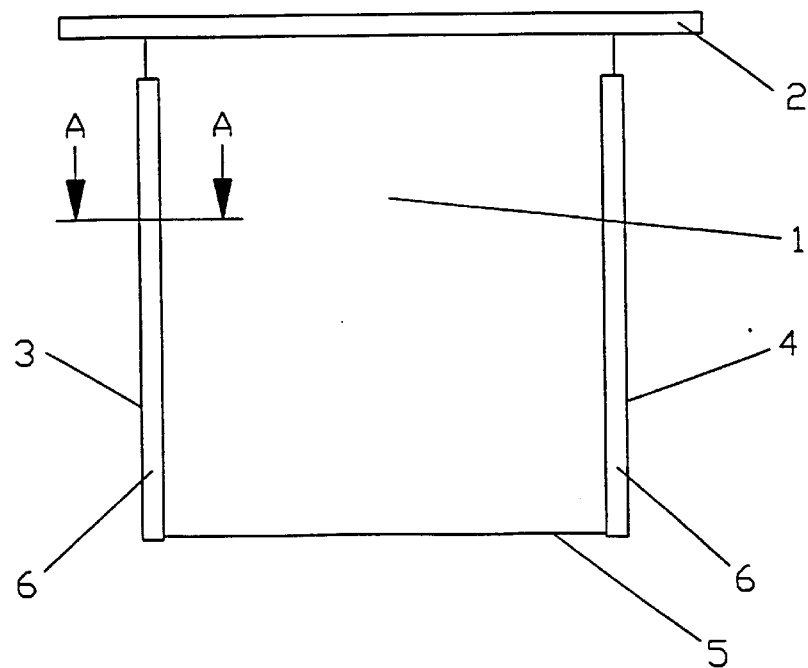
Figure 3:
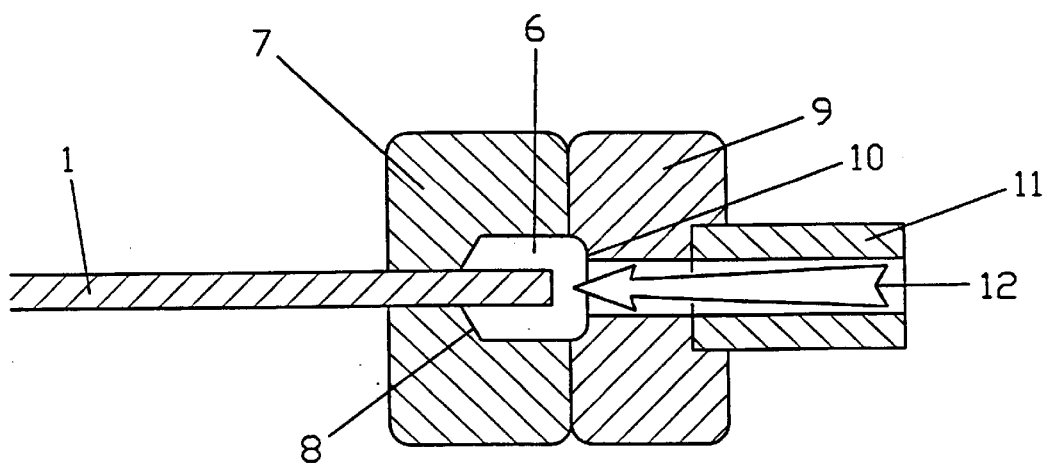

The invention is explained in more detail below, with reference to the appended drawings, wherein FIG. 1 is a side-view illustration of a mother plate produced according to the method of the invention, FIG. 2 is a side-view illustration of another plate produced according to the method of the invention, and FIG. 3 is partial cross-section along the A—A of the embodiment of FIGS. 1 or 2, when realizing the method according to the invention.

According to FIGS. 1 and 3, around the mother plate 1, essentially for at least the length where the edge strip will be installed, there is attached a mould 7. The mould 7 defines the cross-sectional profile of the edge strip 6, apart from the edge 10 of the edge strip which is not in contact with the mother plate. Prior to installing the mould 7 in place, advantageously at least the edges along the sides 3, 4, 5 of the mother plate 1, at least for the section remaining inside the mould 7, are, when necessary, cleaned and pretreated for instance by dressing, sand-blasting or perforating. Moreover, prior to installing the mould 7 in place, the surface 8 of the mould 7 falling into contact with the edge strip 6 is either treated in order to prevent the strip material from adhesion or it is made of a material to which the strip material does not adhere, such as polytetrafluoroethylene.

The plastic edge strip material 12, such as ethylene acrylic acid copolymer, is extruded in the mould 7, so that the nozzle 11 of the extruder is provided with a mould piece 9 defining the cross-sectional profile of the edge 10 of the edge strip 6 deviating from the mother plate. Advantageously the extruder 11 moves with respect to the mould 7 so that the extrusion 8 is started at the top end of the vertical edge 3 of the mother plate and is proceeded in an essentially continuous fashion around those edges of the mother plate 1 that get touch with the electrolyte, as far as the top end of the other vertical side 4 of the mother plate. After the solidification of the strip material 6, the mould 7 is removed and the mother plate is ready to be immersed in electrolysis, supported by the support member 2 provided in the mother plate.

FIG. 2 illustrates a mother plate 1 produced according to the method of the invention, where an edge strip 6 is formed exclusively on the opposite sides 3 and 4 of the plate. The edge strips 6 are formed by attaching the mould 11 first onto the side 4. After forming the edge strip 6 for the side 4, the mother plate 1 is turned 180 degrees with respect to its vertical axis, in order to form the strip 6 on the side 3.

I claim:

1. A method for producing a mother plate used in electrolyte cleaning, said mother plate comprising a metal plate, a support member of the metal plate and a plastic edge strip characterized in that for the edge strip, in the mother plate there is attached a mould provided with an extruder for extruding an edge strip material so that the extruder is made to proceed, with respect to the mould, essentially along the whole length of the mould, and that prior to detaching the mold from the mother plate, the strip material is rendered in an essentially solid form, and in between the edge strip and the mother plate there is created a chemical bond.

2. A method according to claim 1, characterized in that the employed edge strip material is ethylenic acid copolymer.

3. A method according to claim 1, characterized in that the employed edge strip material is polypropylene.

4. A method according to any of the preceding claims 1–3, characterized in that the surface of the mould falling into contact with the edge strip is made of polytetrafluoroethylene.

5. A mother plate produced according to the method described in claim 1, to be used in electrolytic cleaning, characterized in that at least two opposite sides of the mother plate are provided with an edge strip.

6. A mother plate according to claim 5, characterized in that two opposite sides of the mother plate and at least one of the connecting sides are provided with essentially uniform edge strip.

7. A mother plate according to claim 5 or 6, characterized in that the edge strip is made of ethylenic acid copolymer.

8. A mother plate according to claim 5 or 6, characterized in that the edge strip is made of polypropylene.

9. In a method for producing a mother plate used in electrolyte cleaning so that deposits accumulated on surface (s) of the mother plate during electrolytic cleaning are removable from the mother plate, said mother plate comprising a metal plate having four edges, a support member affixed to one edge of the metal plate and a plastic edge strip affixed to one or more edges of the metal plate, the improvement which comprises the steps of:

(a) employing as the edge strip material an insulating plastic which forms, when being solidified, a chemical bond with the metal material of the mother plate;

(b) attaching the mother plate to a mould so that edge(s) of the mother plate onto which the edge material is to be extruded, extends within the mold;

(c) extruding the edge strip material in the mould to form the edge, so that the plastic strip is formed, in situ on opposite sides of the edge(s) within the mold, said edge strip material chemically bonding with opposite sides of the edge(s); and (d) detaching the mold from the mother plate.

10. A method according to claim 9, wherein the employed edge strip material is ethylenic acid copolymer.

11. A method according to claim 9, wherein the employed edge strip material is polypropylene.

12. A method according to claim 9, wherein the surface of the mould that contacts the edge strip is made of polytetrafluoroethylene.

* * * * *